United States Patent
Kumar et al.

(10) Patent No.: US 8,364,975 B2
(45) Date of Patent: Jan. 29, 2013

(54) METHODS AND APPARATUS FOR PROTECTING DATA

(75) Inventors: Mohan J. Kumar, Aloha, OR (US); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1245 days.

(21) Appl. No.: 11/648,472

(22) Filed: Dec. 29, 2006

(65) Prior Publication Data

US 2008/0159541 A1 Jul. 3, 2008

(51) Int. Cl.
*H04L 29/06* (2006.01)
(52) U.S. Cl. ........ 713/189; 713/171; 713/176; 713/183; 713/164; 380/277; 380/282; 380/286
(58) Field of Classification Search .................. 713/155, 713/189; 380/28, 243
See application file for complete search history.

(56) References Cited

U.S. PATENT DOCUMENTS

| | | | |
|---|---|---|---|
| 7,382,883 B2 * | 6/2008 | Cross et al. | 380/281 |
| 2002/0007456 A1 * | 1/2002 | Peinado et al. | 713/164 |
| 2002/0133680 A1 * | 9/2002 | Rosenquist et al. | 711/163 |
| 2004/0005061 A1 * | 1/2004 | Buer et al. | 380/282 |
| 2005/0021944 A1 | 1/2005 | Craft et al. | |
| 2005/0028154 A1 * | 2/2005 | Smith et al. | 717/176 |
| 2005/0071279 A1 * | 3/2005 | Asano | 705/57 |
| 2005/0154889 A1 * | 7/2005 | Ashley et al. | 713/171 |
| 2005/0286722 A1 * | 12/2005 | Aboba et al. | 380/277 |
| 2007/0168048 A1 * | 7/2007 | Allen et al. | 700/2 |
| 2008/0034216 A1 * | 2/2008 | Law | 713/183 |

FOREIGN PATENT DOCUMENTS

| | | |
|---|---|---|
| CN | 1504057 A | 6/2004 |
| CN | 1714330 A | 12/2005 |
| EP | 0707270 A2 | 4/1996 |
| EP | 0707270 A3 | 9/1996 |
| EP | 1 076 280 A1 | 2/2001 |
| EP | 1422591 * | 8/2006 |
| WO | 02/076127 A1 | 9/2002 |
| WO | 2004/046935 A2 | 6/2004 |
| WO | 2004/046935 A3 | 3/2005 |

OTHER PUBLICATIONS

Krishnaswamy, "Secure Manageable Mobile Handset Platform Architectures" Sep. 2006, IEEE Communications Magazine.*
Office Action received for European Patent Application No. 07254931.4 mailed on Apr. 4, 2011, 7 pages.
Office Action received for Chinese Patent Application No. 200710307356.X mailed on Jun. 26, 2009, 10 pages in total, including 3 pages of English Partial Translation (unofficial) and 7 pages of Office Action..

(Continued)

*Primary Examiner* — Taghi Arani
*Assistant Examiner* — Gregory Lane
(74) *Attorney, Agent, or Firm* — Barnes & Thornburg LLP (57) ABSTRACT

An augmented boot code module includes instructions to be executed by a processing unit during a boot process. The augmented boot code module also includes an encrypted version of a cryptographic key that can be decrypted with a cryptographic key that remains in the processing unit despite a reset of the processing unit. In one embodiment, the processing unit may decrypt the encrypted version of the cryptographic key and then use the decrypted key to establish a protected communication channel with a security processor, such as a trusted platform module (TPM). Other embodiments are described and claimed.

14 Claims, 5 Drawing Sheets

OTHER PUBLICATIONS

Office Action received for Chinese Patent Application No. 200710307356.X mailed on Dec. 25, 2009; 10 pages in total, including 3 pages of English Partial Translation (unofficial) and 7 pages of Office Action.

Partial European Search Report for European Patent Application No. 07254931.4 mailed on Oct. 13, 2010; 5 pages.

Simizu, "The Cell Broadband Engine processor security architecture", Apr. 20, 2006, 7 pages.

Extended European Search Report for EP Application No. 07254931.4-2212, Feb. 28, 2011, 10 pages.

Intel Corporation, "Intel Itanium Processor Family System Abstraction Layer Specification", Dec. 2003, 126 pages.

United EFI, Inc., "Unified Extensible Firmware Interface Specification", Jan. 31, 2006, 1476 pages.

Official Communication received for European Patent App. No. 07254931.4, mailed Oct. 26, 2012, 3 pages.

* cited by examiner

METHODS AND APPARATUS FOR PROTECTING DATA

FIELD OF THE INVENTION

The present disclosure relates generally to the field of data processing, and more particularly to methods and related apparatus for protecting data.

BACKGROUND

A processing system may include hardware resources, such as a central processing unit (CPU), random access memory (RAM), and nonvolatile memory. The processing system may also include software resources, such as a basic input/output system (BIOS), a virtual machine monitor (VMM), and one or more guest operating systems (OSs) running on the VMM. When the computer system is started or reset, it may load the BIOS, and then the VMM. The VMM may then create one or more virtual machines, and the virtual machines may boot to different OSs or to different instances of the same OS.

In addition to RAM and one or more CPUs, a processing system may include a security coprocessor, such as a trusted platform module (TPM). A TPM is a hardware component that resides within a processing system and provides various facilities and services for enhancing the security of the processing system. For example, a TPM may be implemented as an integrated circuit (IC) or semiconductor chip, and it may be used to protect data and to attest to the configuration of a platform. A TPM may be implemented in accordance with specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG and is available from the Internet at www.trustedcomputing-group.org/home.

The sub-components of a TPM may include an execution engine and secure nonvolatile (NV) memory or storage. The secure NV memory is used to store sensitive information, such as encryption keys, and the execution engine protects the sensitive information according to the security policies dictated by the TPM's control logic.

In general, a TCG-compliant TPM provides security services such as attesting to the identity and/or integrity of the platform, based on characteristics of the platform. The platform characteristics typically considered by a TPM include hardware components of the platform, such as the processor (s) and chipset, as well as the software residing in the platform, such as the firmware and OS. A TPM may also support auditing and logging of software processes, as well as verification of platform boot integrity, file integrity, and software licensing. A TPM may therefore be considered the root of trust for a platform.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

In a platform with a TPM, platform measurements and encryption can be used to seal sensitive information or secrets to the TPM. For instance, in a processing system with a VMM, secrets can be sealed to the TPM using measurements of the VMM and other platform components. The TPM may prevent the secrets from subsequently being released or unsealed from the TPM unless VMM and other platform measurements are verified to match the measurements used for sealing. However, when a secret is unsealed, it may be communicated in plain text (i.e., not encrypted) over a communication channel in the processing system between the TPM and the CPU.

The present disclosure describes mechanisms and processes for communicating secrets between a security coprocessor (e.g., a TPM) and a processing unit (e.g., a CPU) in an encrypted format. Consequently, even if an attacker were to snoop the internal buses in the processing system, the attacker would not be able to intercept plain text secrets.

The described mechanisms and processes may be suitable for providing enhanced protection for high value content, with regard to digital rights management (DRM), for example. As described in greater detail below, in one embodiment, the data on the communication channel between the TPM and the CPU is encrypted using persession cryptographic keys. In addition, the CPU and the TPM are provisioned in advance with a cryptographic key (referred to herein as a "third party key" or "3PK") to be used for authenticating the session end points and creating the per-session cryptographic keys.

For purposes of this disclosure, with regard to processing units and with regard to processing systems that include processing units, a "first party" is the manufacturer of the processor, and a "third party" is any other entity associated with the processing unit or processing system. For instance, manufacturers of processing systems and owners of processing systems are considered "third parties."

Referring again to the third party key, the manufacturer of the CPU need not load the 3PK into the CPU or the TPM. Indeed, since the TPM is associated with the platform, if the CPU manufacturer does not also assemble platforms, the CPU manufacturer may have no opportunity to load the 3PK into the TPM. Instead, the 3PK, and the process for loading it into a processing system, can be controlled primarily by some other party, such as the manufacturer of the processing system. For example, as described in greater detail below, when building a processing system, an original equipment manufacturer (OEM) may obtain an authentication code (AC) module that has been augmented to contain the 3rd party cryptographic key to be installed in the CPU of that processing system. As described in greater detail below, within the augmented AC module (MCM), the 3PK may be protected by encryption, based on a processing unit key (PUK). The AACM may also be protected with a signature. For purposes of this disclosure, a processing unit key or PUK is a cryptographic key that is stored in a processor when the processor is manufactured, and that remains in the processor in nonvolatile form. For instance, the processor may retain the key despite a power cycle or reset of the processor.

An AACM may be stored in boot storage (e.g., flash memory that typically contains the BIOS code). The platform builder may also install the 3PK into the TPM of the platform during platform manufacturing. Subsequently, on reset, the CPU may locate and run the AACM. Accordingly, AC modules, and similar-types of modules, that have been augmented with an encrypted 3PK may be considered augmented boot code modules. In one embodiment, the CPU may use a firmware interface table (FIT) as a standard mechanism to locate and run the AACM. Additional information about FITs is provided in the Intel® Itanium® Processor Family System Abstraction Layer Specification, dated December 2003, which may be obtained from the Internet at download.intel.com/design/Itanium/Downloads/24535907.pdf. When run, the AACM may install the 3PK to CPU registers that are only modifiable by privileged code. Thus, a platform may use the methodology described herein to carry OEM keys in BIOS memory and securely install them into the processor at each boot.

An AACM may also initialize the TPM and create a session key that will be used by the processor and TPM to encrypt data exchanged between the two components. For example, once 3PKs have been installed into the processor and the TPM, those keys can in turn be used to generate one or more session keys, using standard cryptographic schemes. The session is then used to secure communications between the processor and the TPM.

The described solution allows secure communication between a CPU and a security processor such as a TPM, thus ensuring secure exchange, even against an attacker with sophisticated snooping hardware and physical access to the machine. For instance, a platform according to the present disclosure may ensure that cryptographic keys used for protecting the data content (e.g., a key for protecting a Moving Picture Experts Group (MPEG) movie, a key for protecting a database of credit card information, etc.) are protected from in-target probe (ITP) based attacks.

In addition, the present disclosure describes a convenient, flexible way to provision a platform with keys for establishing a protected communication channel. A key may be selected by a third party and installed into a platform by that third party. The 3PK key need not be built in to the processor. The processor manufacturer therefore need not know the 3PK. In addition, should a processor be returned to the manufacturer, the processor may be reused without compromising the 3PK. A, 3PK may be changed if needed by a trusted agent, and a 3PK may be tied to the processor only when the processor is present in a platform.

Figure 1:
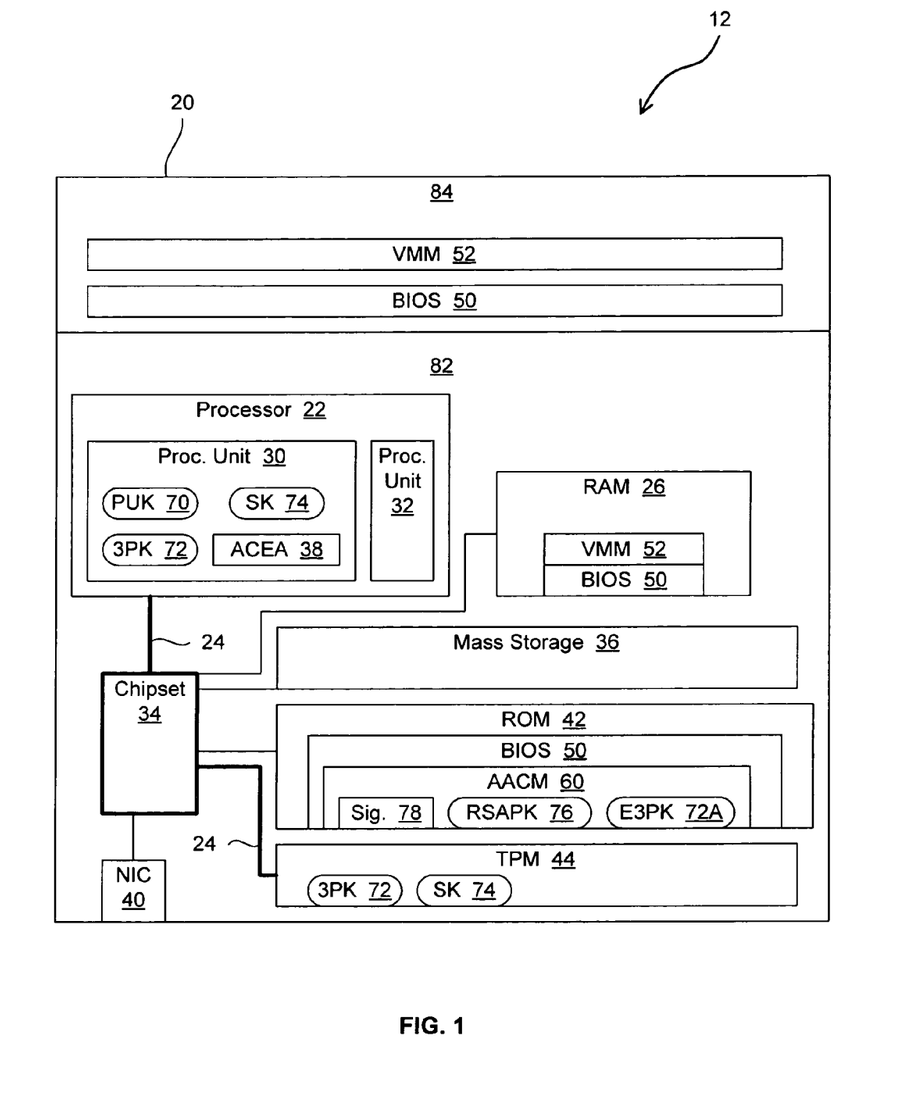
FIG. 1 is a block diagram depicting a suitable data processing system in which certain aspects of an example embodiment of the present invention may be implemented.

FIG. 1 is a block diagram depicting a suitable data processing system 20 in which certain aspects of an example embodiment 12 of the present invention may be implemented. Data processing system 20 has various hardware components 82, such as a central processing unit (CPU) 22, communicatively coupled to various other components via one or more system buses 24 or other communication pathways or mediums. This disclosure uses the term "bus" to refer to shared communication pathways, as well as point-to-point pathways. CPU 22 may include two or more processing units, such as processing unit 30 and processing unit 32. Alternatively, a processing system 20 may include a CPU with one processing unit, or multiple processors, each having at least one processing unit. The processing units 30, 32 may be implemented as processing cores, as Hyper-Threading (HT) technology, or as any other suitable technology for executing multiple threads simultaneously or substantially simultaneously.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems, such as through a network interface controller (NIC) 40, a modem, or other communication ports or couplings. Processing systems may be interconnected by way of a physical and/or logical network, such as a local area network (LAN), a wide area network (WAN), an intranet, the Internet, etc. Communications involving the network may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Figure 2:
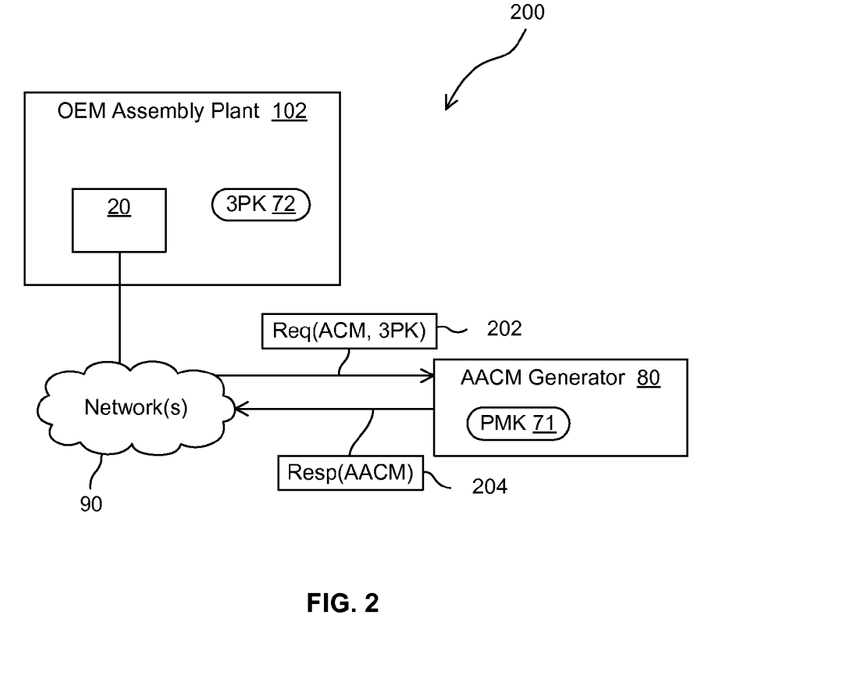
FIG. 2 is a block diagram depicting an example data processing environment involving the data processing system of FIG. 1.

FIG. 2 is a block diagram depicting an example data processing environment 200 involving processing system 20 from FIG. 1. In particular, data processing environment 200 includes processing system 20 as a local processing system, and a remote processing system referred to as an MCM generator 80. Processing system 20 and MCM generator 80 may communicate via a network 90. For instance, processing system 20 may be located in an OEM assembly plant 102, and when the OEM is assembling or configuring processing system 20, the OEM may cause processing system 20 to communicate with MCM generator 80 to provision processing system 20 with a 3PK specific to that OEM, as described in greater detail below with regard to FIG. 3. In particular, as described below, the OEM may cause AACM generator 80 to embed 3PK 72 in the preliminary AC module, thereby converting it into an AACM specific to that OEM.

Referring again to FIG. 1, within processing system 20, processor 22 may be communicatively coupled to one or more volatile or nonvolatile data storage devices, such as RAM 26, read-only memory (ROM) 42, mass storage devices 36 such as hard drives, and/or other devices or media, such as floppy disks, optical storage, tapes, flash memory, memory sticks, digital video disks, etc. For purposes of this disclosure, the term "ROM" may be used in general to refer to nonvolatile memory devices such as erasable programmable ROM (EPROM), electrically erasable programmable ROM (EEPROM), flash ROM, flash memory, etc. Processor 22 may also be communicatively coupled to additional components, such as a video controller, integrated drive electronics (IDE) controllers, small computer system interface (SCSI) controllers, universal serial bus (USB) controllers, input/output (I/O) ports, input devices, output devices such as a display, etc.

In the embodiment of FIG. 1, processing system 20 also includes a TPM 44. In other embodiments, other types of security coprocessors may be used. Processor 22, RAM 26, TPM 44, and other components may be connected to a chipset 34. Chipset 34 may include one or more bridges or hubs for communicatively coupling system components, as well as other logic and storage components.

Some components, such as the video controller for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or nonvolatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations. The programs in processing system 20 may be considered components of a software environment 84.

For instance, when processing system 20 boots, a BIOS 50 and a VMM 52 may be loaded into RAM 26 and executed within software environment 84. BIOS 50 may be implemented in accordance with Version 2.0 of the Unified Extensible Firmware Interface Specification, dated Jan. 31, 2006, for instance. ROM 42 may also include modules such as an augmented AC module (AACM) 60, as described in greater detail below.

Figure 3:
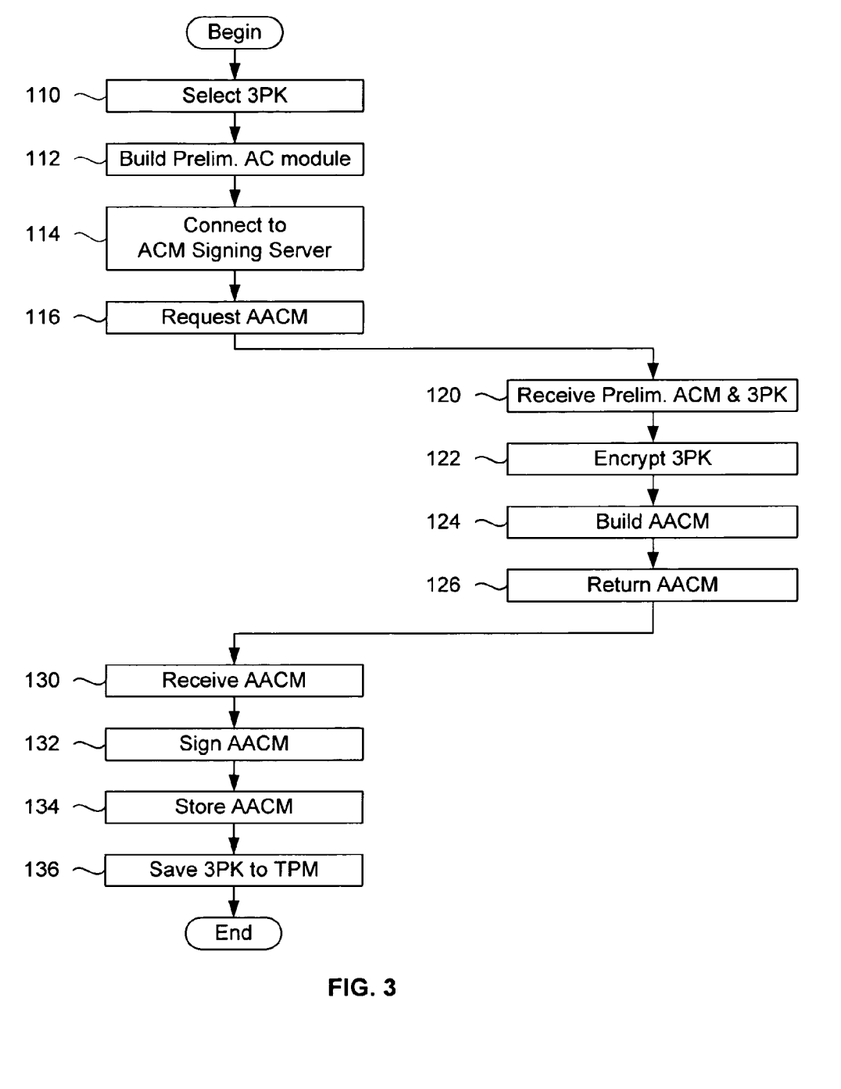
FIG. 3 is a flowchart of a process for provisioning the processing system of FIG. 1 with a third party key, according to an example embodiment of the present invention.

FIG. 3 is a flowchart of a process for provisioning processing system 20 with a 3PK, according to an example embodiment of the present invention. The illustrated process pertains to assembly or configuration operations, managed by an OEM, beginning after the OEM has selected processing system 20 to be provisioned with a 3PK. At block 110, the OEM selects a 3PK to be provisioned.

At block 112, the OEM prepares a preliminary AC module. In the example embodiment, the OEM uses a format such as the one described in the LaGrande Technology Preliminary Architecture Specification, dated September 2006 (hereinafter "the LTPA Specification"), for the AC module. The LTPA Specification is currently available from the Internet at www.intel.com/technology/security/downloads/LT_spec_0906.pdf.

The example processing system of FIG. 1 provides launch and control interfaces using functions known as safer mode extensions (SMX). Additional information concerning SMX may be obtained from the LTPA Specification. The LTPA Specification also describes how an AC module can be authenticated and executed. For example, pages 11 and 12 provide the following explanations:

> To support the establishment of a protected environment, SMX enables the capability of an authenticated code execution mode. This provides the ability for a special code module, referred to as the authenticated code module (AC module), to be loaded into internal RAM (referred to as authenticated code execution area) within the processor. The AC module is first authenticated and then executed using a tamper resistant method.
>
> Authentication is achieved through the use of a digital signature in the header of the AC module. The processor calculates a hash of the AC module and uses the result to validate the signature. Using SMX, a processor will only initialize processor state or execute the AC code module if it passes authentication. Since the authenticated code module is held within internal RAM of the processor, execution of the module can occur in isolation with respect to the contents of external memory or activities on the external processor bus.

Referring again to block 112, to prepare the preliminary AC module, the OEM may load user code/data into the user area of the preliminary AC module. Here, the preliminary AC module serves as a formatted input of OEM content that needs to be embedded in the augmented AC module. Processing system 20 may also populate other portions of the preliminary AC module, such as the size field, for instance.

As shown at block 114, processing system 20 may then connect to MCM generator 80. In the example embodiment, processing system 20 and AACM generator 80 establish a secure channel to communicate encrypted data. Any suitable technique may be used to establish that secure channel. As shown at block 116, processing system 20 may then send a message or request 202 to MCM generator 80. As shown in FIG. 2, request 202 may include the preliminary AC module, as well as the desired 3PK. In the example embodiment, the preliminary AC module will contain a field that the OEM or 3rd party manufacturer populates to indicate the processor family for which the MCM is sought. As shown at blocks 120 and 122, AACM generator 80 may receive the preliminary AC module and the 3PK from processing system 20, and may then encrypt the 3PK.

In the embodiment of FIG. 2, MCM generator 80 is managed by the manufacturer of processor 22, and AACM generator 80 uses a predetermined processor manufacture key (PMK) 71 to encrypt the 3PK. In the embodiment of FIG. 2, PMK 71 is a private key, and processing unit 30 includes a PUK 70 that is the corresponding public key. In another embodiment, the PMK and the PUK may be the same key (i.e., they may have the same value).

In the embodiment of FIG. 1, PUK 70 may be permanently burned into processing unit 30 by the manufacturer of processor 22 during the manufacturing process, before processor 22 is shipped to a purchaser such as an OEM. The manufacturer of processor 22 may keep PMK 71 secret, such that no other entity ever learns the value of PMK 71. Alternatively, the processor manufacturer may arrange for a separate trusted entity to manage MCM generator 80. Although PUK 70 may be considered a "public" key, it may also be kept secret, such that its value is never released by processing unit 30.

Referring again to FIG. 3, AACM generator 80 then builds an MCM 60 that includes the encrypted 3PK (E3PK) 72A, as shown at block 124. In particular, referring again to FIG. 2, when building AACM 60, MCM generator 80 may append E3PK to the user data of the preliminary AC module and update the module size field. Alternatively, AACM 60 may include a predefined field for holding an encrypted 3PK. An AACM that includes an encrypted version of a 3PK may also be referred to as an encrypted AC module.

Referring again to FIG. 3, AACM generator 80 then sends AACM 60 to processing system 20 (e.g., Resp(AACM) 204 of FIG. 2), as shown at block 126. Processing system 20 may receive AACM 60 from MCM generator 80 at block 130. Processing system 20 may then sign MCM 60, as indicated at block 132. For example, the OEM may select an AC module key pair, such as a Rivest, Shamir, Adelman (RSA) public/private key pair, and may then load the public key from that pair into the header of MCM 60. The OEM may use the private key from that pair to generate an RSA signature for AACM 60, possibly based on a hash of the user area and possibly other portions of AACM 60. The OEM may then store that RSA signature in the header of MCM 60. Thus, the OEM (or other third party) may select the 3PK as well as the RSA public key for the AC module. Consequently, to distinguish between those keys, the RSA public key may be referred to as the primary module key, and the 3PK may be referred to as a supplemental module key.

As shown at block 134, processing system 20 may then store AACM 60 in ROM 42, as depicted in FIG. 1. In the embodiment of FIG. 1, processing unit 30 is configured to serve as a bootstrap processor (BSP), and processing system 20 is configured to use ROM 42 as the boot storage (i.e., the nonvolatile storage from which processing unit 30 obtains instructions for initializing and configuring processing system 20 at power up or reset).

Processing system 20 may then save 3PK 72 into TPM 44, as shown at block 136. For instance, processing system 20 may securely install 3PK 72 into TPM 44 during each boot. Alternatively, the OEM could provision 3PK 72 into TPM 44 during processing system manufacturing.

Figure 4:
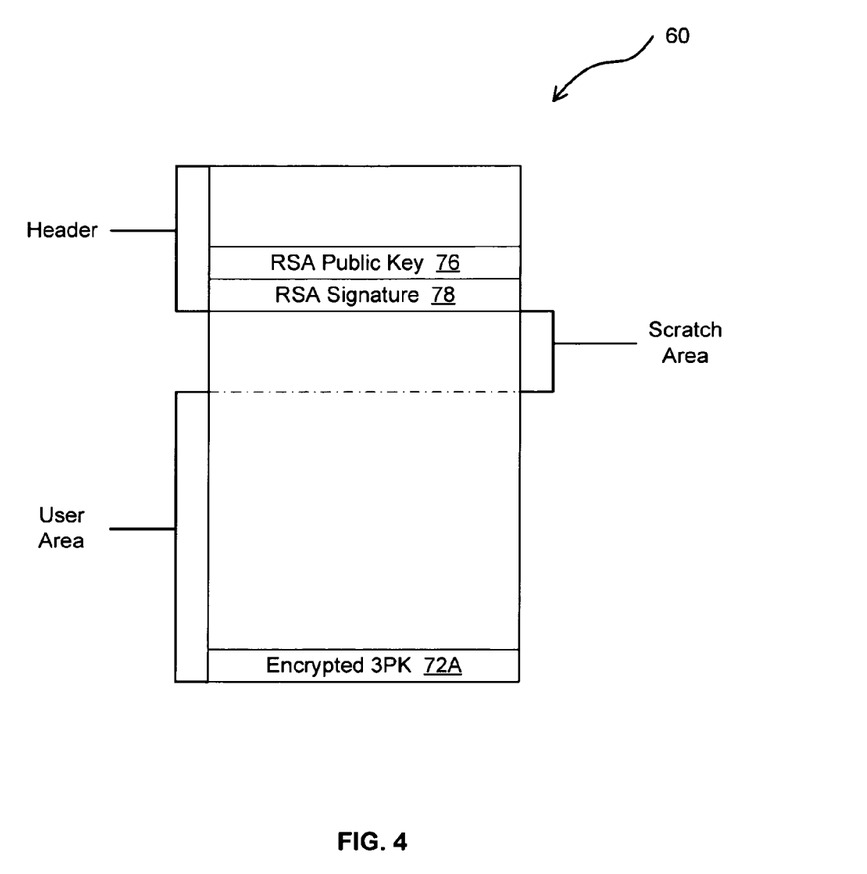
FIG. 4 is a block diagram of an augmented authenticated code module, according to an example embodiment of the present invention.

FIG. 4 is a block diagram of the MCM 60 of FIG. 1, showing RSA public key 76 and RSA signature 78 in the module header, which is followed by a scratch area, followed by a user area with the encrypted 3PK 72A appended at or near the end of the module, following the user code and user data from the preliminary AC module. Alternatively, an AC module may be structured with an independent field to hold an encrypted 3PK, possible in the module's header.

Thus, an OEM or other entity performing system configuration may install a cryptographic key (e.g., E3PK 72A) into ROM 42. Furthermore, since that key is itself encrypted, even if an attacker were able to extract E3PK 72A from ROM 42, the attacker still would not be able to decrypt and use E3PK 72A.

Figure 5:
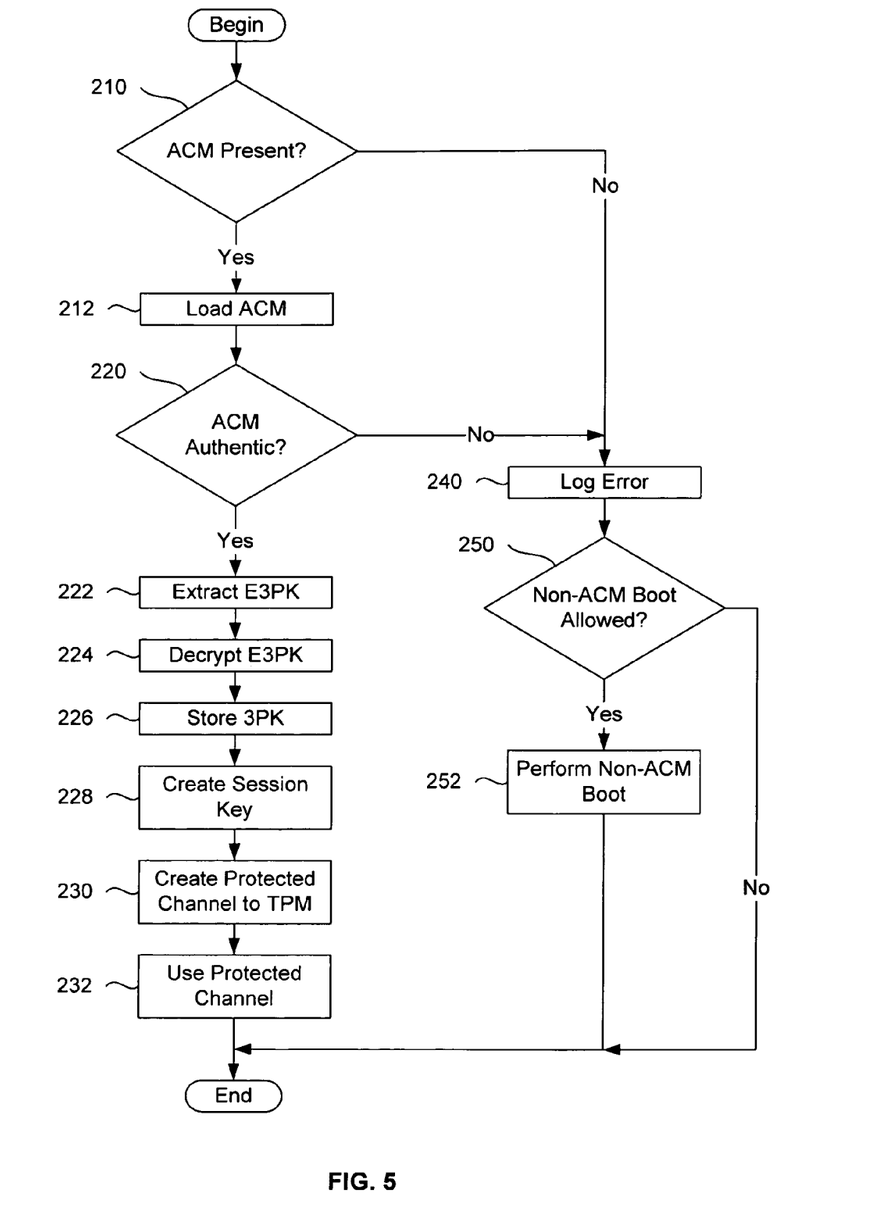
FIG. 5 is a flowchart of a process for establishing a protected communication channel between a processing unit and a security coprocessor, according to an example embodiment of the present invention.

FIG. 5 is a flowchart of a process for establishing a protected communication channel between a processing unit and a TPM according to an example embodiment of the present invention. FIG. 1 uses bold lines on buses 24 and chipset 34 to depict an example of such a secure channel as established between processing unit 30 and TPM 44 according to the process of FIG. 5. That process begins after MCM 60 with E3PK 72A has been stored in ROM 42, possibly according to a process such as the one described above.

In particular, the process of FIG. 5 may begin in response to processing system 20 being powered on or reset, which may cause microcode in processing unit 30 to examine a predetermined location in ROM 42 to determine whether ROM 42 contains an AC module. If an AC module is found, processing unit 30 may load the AC module into protected internal RAM within processing unit 30. The protected internal RAM to receive the AC module may be referred to as the authenticate code execution area (ACEA) 38.

For purposes of illustration, one may assume that processing unit 30 finds AACM 60 in ROM 42. As indicated at block 220, processing unit 30 may then determine whether AACM 60 is authentic, in accordance with the excerpt above from the LTPA Specification. For instance, processing unit 30 may (a) calculate a hash of certain portions of AACM 60, (b) use RSA public key 76 to decrypt signature 78, and (c) compare the decrypted signature with the hash to determine whether AACM 60 matches what the OEM originally signed with the corresponding RSA private key. Processing unit 30 may also verify RSA public key 76 against a predetermined list of valid public keys. For instance, processing unit may derive a hash value from RSA public key 76 and compare that value against a list of valid hash values in protected storage in processing system 20. If RSA public key 76 verifies good, and the hash of AACM 60 matches the decrypted RSA signature, processing unit 30 may conclude that AACM 60 is authentic.

If processing unit 30 is unable to find an AC module, or if processing unit 30 finds an AC module but determines that it is not authentic, processing unit 30 may log an appropriate error message, as indicated at block 240. Processing unit 30 may then check a configuration setting in processing system 20 to determine whether processing system 20 should be allowed to use a non-ACM boot process, as depicted at block 250. If a non-ACM boot is to be allowed, processing unit 30 may perform the non-ACM boot as depicted at block 252. If non-ACM boot is not allowed, the process may end without processing system 20 booting.

Referring again to block 220, if processing unit 30 determines that AACM 60 is authentic, processing unit 30 may then extract E3PK 72A from AACM 60, as shown at block 222. Processing unit 30 may temporarily store E3PK 72A in one or more processor registers or other internal storage, for instance.

Processing unit 32 then decrypts E3PK 72A and saves the result (i.e., 3PK 72) in protected storage within processing unit 32, as shown at blocks 224 and 226. In the embodiment of FIG. 1, that protected storage is implemented as one or more registers that (a) are only modifiable by privileged code; (b) cannot be read, written, or debugged by non-privileged code; and (c) cannot be accessed by ITPs. In this context, privileged code is code that could be carried external to the processor, but that requires special authentication before it is run by the processor, and that then runs in the processor in a sanitized environment, such that the privileged code execution cannot be observed or manipulated by malicious parties. In the embodiment of FIG. 1, processing unit 30 uses PUK 70 to decrypt E3PK 72A.

As shown at block 228, processing unit 30 and TPM 44 may then use 3PK 72 to create a session key (SK) 74 to be used for protecting communications between processing unit 30 and TPM 44. Processing unit 30 and TPM 44 may then use SK 74 to create a protected channel, as shown at block 230. That protected channel may traverse multiple system buses 24 and zero or more components of chipset 34. TPM 44 and processing unit 30 may then use SK 74 to encrypt communications, as indicated at block 232. In alternative embodiments, multiple session keys may be used for protecting communications between processing unit 30 and TPM 44.

The protected channel may be used, for instance, to load keys or other protected information from TPM 44 into processing unit 30. Likewise, the protected channel may be used to send keys or other sensitive information from processing unit 30 to TPM 44. The protected channel thus ensures that any viewer of the channel cannot determine the contents of the communications, and protects against modification of the data in transit. Furthermore, the process for initializing the channel may authenticate the end-points to protect against unauthorized access and against replay and TPM swap attacks.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for protecting data, the method comprising:
   retrieving an encrypted version of a cryptographic key from storage of a processing system into a processing unit of the processing system, the cryptographic key being encrypted using a private processor manufacture key;
   using a processing unit key to decrypt the encrypted version of the cryptographic key, the processing unit key being (i) a public key corresponding to the private processor manufacture key and (ii) permanently burned into the processing unit;
   storing the decrypted key in protected storage in the processing unit, wherein the protected storage cannot be accessed by snooping a processing system bus communicatively coupled to the processing unit;
   using the decrypted key to create a session key with the processing unit, wherein the session key is different from the decrypted key;
   creating a corresponding session key with a trusted platform module of the processing system using an unencrypted version of the cryptographic key installed into the trusted platform module; and
   using the session key and the corresponding session key to establish a protected communication channel between the processing unit and the trusted platform module of the processing system.

2. A method according to claim 1, wherein the operation of retrieving the encrypted version of the cryptographic key from storage comprises:
   retrieving the encrypted version of the cryptographic key from nonvolatile memory of the processing system during a boot process for the processing system.

3. A method according to claim 1, wherein the operation of retrieving the encrypted version of the cryptographic key from storage comprises:
   retrieving a code module from boot memory of the processing system during a boot process for the processing system; and
   extracting the cryptographic key from the code module.

4. A method according to claim 1, wherein:
   the cryptographic key comprises a third party key; and
   the processing unit key comprises a key that remains in the processing unit despite a reset of the processing unit.

5. A method comprising:
   saving a first key to a trusted platform module of a processing system;
   sending the first key to a remote processing system;
   receiving an encrypted version of the first key from the remote processing system, the first key being encrypted using a private processor manufacture key;
   saving a code module to boot storage in the processing system, wherein the code module comprises user data, the encrypted version of the first key, and a signature generated with a second key;
   decrypting the encrypted version of the first key using a processing unit key, the processing unit key being (i) a public key corresponding to the private processor manufacture key and (ii) permanently burned into a processor of the processing system;
   generating a session key from the decrypted first key with the processor of the processing system, wherein the session key is different from the decrypted first key;
   creating a corresponding session key with the trusted platform module using an unencrypted version of the first key installed into the trusted platform module; and
   establishing a protected communication channel between the processor of the processing system and the trusted platform module with the session key and the corresponding session key.

6. A method according to claim 5, further comprising:
   sending the user data for the code module to the remote processing system in a preliminary code module; and
   receiving the encrypted version of the first key from the remote processing system in the code module.

7. A method according to claim 5, wherein:
   the operation of sending the first key to a remote processing system comprises sending the first key to an augmented authentication code module (AACM) generator; and
   the operation of receiving an encrypted version of the first key from the remote processing system comprises receiving an AACM from the AACM generator, wherein the AACM comprises the encrypted version of the first key.

8. A method according to claim 5, wherein:
the second key used to generate the signature for the code module comprises a private key; and
method comprises loading a public key that corresponds to the private key into the code module.

9. An apparatus comprising: a machine-accessible medium device; and
an augmented boot code module in the machine-accessible medium device,
wherein the augmented boot code module comprises:
instructions to be executed by a processing unit of a processing system during a boot process;
an encrypted version of a first cryptographic key that can be decrypted with a second cryptographic key stored in storage of the processing unit, the first cryptographic key being encrypted using a private processor manufacture key, and wherein the second cryptographic key comprises a processing unit key being (i) a public key corresponding to the private processor manufacture key and (ii) permanently burned into the processing unit;
two or more session keys created by the processing unit from a decrypted version of the first cryptographic key, wherein each of the two or more session keys are different from the decrypted version of the first cryptographic key; and
two or more corresponding session keys created with a trusted platform module of the processing system using an unencrypted version of the first cryptographic key installed in the trusted platform module, and wherein at least one of the two or more session keys and at least one of the two or more corresponding session are used to establish a secure communication channel between the processing unit and the trusted platform module in the processing system across two or more processing system buses.

10. A processing system comprising:
a processing unit;
nonvolatile storage in communication with the processing unit;
a trusted platform module in communication with the processing unit; and
an augmented code module in the nonvolatile storage, wherein the augmented code module comprises:
instructions to be executed by the processing unit during a boot process;
an encrypted version of a first cryptographic key that can be decrypted with a second cryptographic key, the first cryptographic key being encrypted using a private processor manufacture key, and wherein the second cryptographic key comprises (i) a public key corresponding to the processor manufacture key and (ii) being burned into the processing unit such that the second cryptographic key remains in the processing unit despite a reset of the processing unit;
a session key created by the processing unit from a decrypted version of the first cryptographic key, wherein the session key is different from the decrypted version of the first cryptographic key; and
a corresponding session key created with the trusted platform module using an unencrypted version of the first cryptographic key installed into the trusted platform module, wherein the session key and the corresponding session key are used to establish a secure communication channel between the processing unit and the trusted platform module of the processing system.

11. A processing system according to claim 10, wherein the nonvolatile storage comprises instructions which, when executed by the processing unit, cause the processing system to perform operations comprising:
retrieving the encrypted version of the first cryptographic key from the nonvolatile storage of the processing system into the processing unit;
decrypting the encrypted version of the first cryptographic key using the second cryptographic key;
storing the decrypted key in a protected part of the processing unit; and
using the session key and the corresponding session key to establish a protected communication channel between the processing unit and the trusted platform module across two or more processing system buses.

12. A processing system according to claim 11, wherein the operation of storing the decrypted key in a protected part of the processing unit comprises:
storing the decrypted key in a part of the processing unit that cannot be accessed by snooping a processing system bus communicatively coupled to the processing unit.

13. A processing system according to claim 10, wherein the second cryptographic key comprises a processing unit key, and
wherein the nonvolatile storage comprises instructions which, when executed by the processing unit, cause the processing system to decrypt the encrypted version of the first cryptographic key using the processing unit key.

14. A processing system according to claim 13, wherein:
the first cryptographic key comprises a third party key provisioned by a third party; and
the processing unit key comprises a key stored in nonvolatile storage of the processing unit by a first party.

* * * * *